(12) United States Patent
Siessegger et al.

(10) Patent No.: US 9,241,380 B2
(45) Date of Patent: Jan. 19, 2016

(54) HYBRID DIMMING CONTROL TECHNIQUES FOR LIGHTING DRIVERS

(71) Applicants: Bernhard Siessegger, Danvers, MA (US); Benjamin Alexandrovich, Brookline, MA (US)

(72) Inventors: Bernhard Siessegger, Danvers, MA (US); Benjamin Alexandrovich, Brookline, MA (US)

(73) Assignee: OSRAM SYLVANIA INC., Wilmington, MA (US)

( * ) Notice: Subject to any disclaimer, the term of this patent is extended or adjusted under 35 U.S.C. 154(b) by 31 days.

(21) Appl. No.: 14/196,619

(22) Filed: Mar. 4, 2014

(65) Prior Publication Data
US 2015/0257223 A1  Sep. 10, 2015

(51) Int. Cl.
*H05B 41/00* (2006.01)
*H05B 33/08* (2006.01)

(52) U.S. Cl.
CPC ........ *H05B 33/0818* (2013.01); *H05B 33/0821* (2013.01); *H05B 33/0824* (2013.01); *H05B 33/0827* (2013.01); *H05B 33/0845* (2013.01); *H05B 33/083* (2013.01)

(58) Field of Classification Search
None
See application file for complete search history.

(56) References Cited

U.S. PATENT DOCUMENTS

| | | | |
|---|---|---|---|
| 7,902,768 B2 | 3/2011 | Zanforlin | |
| 8,373,304 B2* | 2/2013 | Chang et al. | 307/31 |
| 2009/0267531 A1 | 10/2009 | Zanforlin | |
| 2010/0027306 A1 | 2/2010 | Loef et al. | |
| 2010/0213857 A1* | 8/2010 | Fan | 315/186 |
| 2010/0301766 A1 | 12/2010 | Zudrell-Koch et al. | |
| 2011/0001439 A1 | 1/2011 | Cecconello et al. | |
| 2011/0248638 A1* | 10/2011 | Aso | 315/185 R |
| 2012/0062147 A1* | 3/2012 | Fan | 315/297 |

FOREIGN PATENT DOCUMENTS

DE   102010031247 A1   9/2011

* cited by examiner

*Primary Examiner* — Douglas W Owens
*Assistant Examiner* — Dedei K Hammond
(74) *Attorney, Agent, or Firm* — Andrew Martin

(57) ABSTRACT

Techniques are disclosed for independent control of individual LED strings driven from a single AC current source. A lighting driver circuit includes a DC-AC inverter with series resonance that provides a current that may be split into multiple currents for driving multiple LED assemblies. Current splitting transformers may be used to divide the current from the AC source, and the amplitude of the current from the AC source may be determined by a microcontroller. In some cases the current splitting transformers provide galvanic isolation to the LED assemblies. The multiple LED assemblies may be controlled by a number of switches that may independently activate the individual LED assemblies based on the duty cycle of multiple PWM signals provided to the switches by the microcontroller. When all of the PWM signals output from the microcontroller are on an off-cycle, the current source may be turned off.

17 Claims, 15 Drawing Sheets

HYBRID DIMMING CONTROL TECHNIQUES FOR LIGHTING DRIVERS

FIELD OF THE DISCLOSURE

This disclosure relates to lighting driver circuitry, and more particularly, to LED drivers utilizing a series resonant inverter.

BACKGROUND

In fluorescent lamp ballasts, inverting a DC power supply voltage into AC current may involve utilizing series resonant inverters. DC-AC inverters for driving LED strings involve a number of non-trivial challenges.

DETAILED DESCRIPTION

Figure 1:
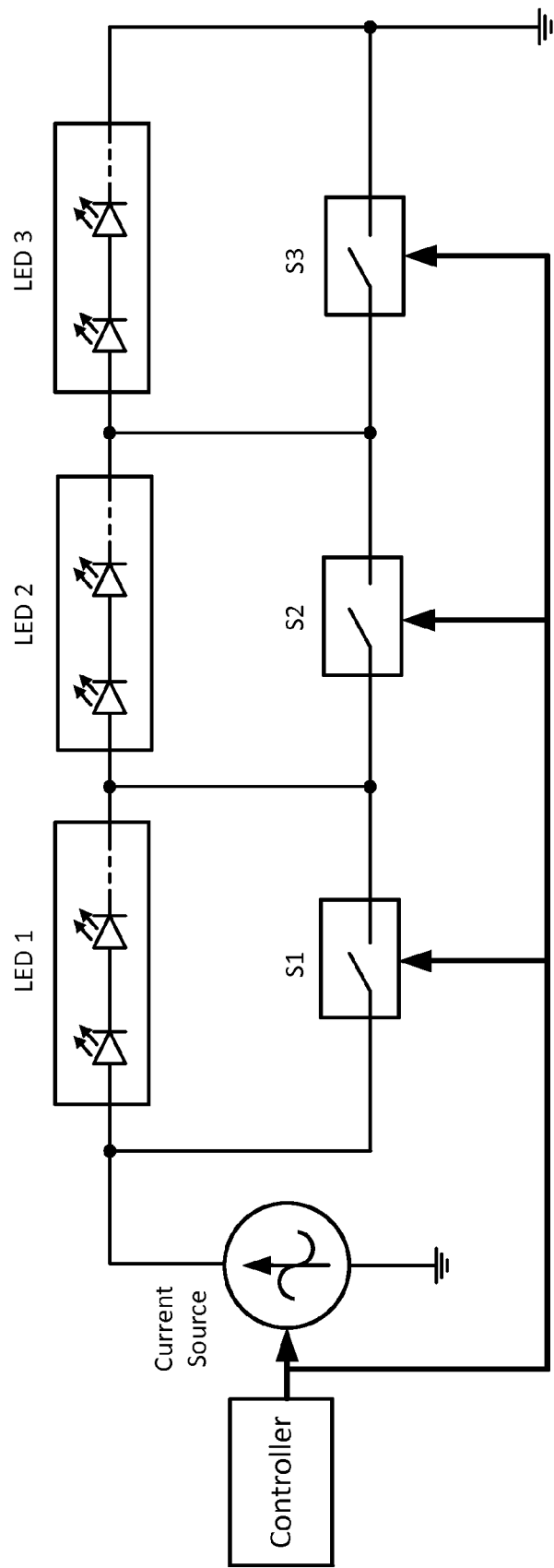
FIG. 1 shows an example lighting system configured for independent control of multiple LED assemblies, in accordance with an embodiment of the present invention.

Techniques are disclosed for independent control of individual LED strings driven from a single AC current source. The techniques may be implemented, for instance, in a lighting driver circuit that includes a DC-AC inverter with series resonance, one or more current splitters, a number of LED assemblies, a number of switches for operating the LED assemblies, and a microcontroller for determining the amplitude of the AC current source as well as controlling the switches, in accordance with one embodiment of the present invention. The current source provides a current that may be split into multiple currents for driving multiple LED assemblies and current splitting transformers may be used to divide the current from the AC source, in some embodiments. The LED assemblies may include an LED string, rectifying diodes, and capacitors. In some cases the current splitting transformers provide galvanic isolation to the LED assemblies, while in other cases an additional isolating transformer may be used to isolate the LED assemblies. The multiple LED assemblies may be controlled by the switches that independently activate the individual LED assemblies based on the duty cycle of multiple PWM signals provided to the switches by the microcontroller. When all of the PWM signals output from the microcontroller are on an off-cycle, the current source may be turned off.

General Overview

As previously explained series resonant inverters are used in fluorescent lamp ballasts and are an efficient means of implementing a DC-AC inverter. As will be appreciated in light of this disclosure, such inverters may also be suitable for driving LED strings, and the resonant inverter could be either self-oscillating or externally driven. In some cases, the operating frequency of such inverters is optimized in terms of their cost and performance. The transformer in the series resonant inverter may also be used to provide galvanic isolation between the input and the output of the inverter. When driving multiple LED strings from a single AC current source, independent control of each LED string is desirable. Furthermore, combining light level dimming with precision color tuning is a highly desired feature of LED light sources, and the driver required for this task should allow independent control of each color.

Thus, in accordance with an embodiment of the present invention, techniques are disclosed for independent control of individual LED strings driven from a single AC current source. In one embodiment, a lighting driver circuit controls multiple LED strings which may include one or more multicolor LED strings or LED strings of different colors. The LED strings may be controlled, for example, through independent tuning of the individual current inputs of the LED strings. An additional feature of the LED driver may be isolation of its inputs from the mains, and such isolation can be accomplished through a high frequency isolation transformer. Such transformers can be efficiently integrated into DC-AC inverter topologies. For the purposes of this disclosure, a DC-AC inverter with series resonance is considered as it exhibits characteristics which are close to the ideal current source. The output current of such an inverter may be defined by the supply DC voltage and the resonance network inductance, and this current may remain constant with a varying load, in some embodiments. In some embodiment, the lighting driver circuit may include a microcontroller unit (MCU) or other suitable processor for controlling the amplitude of the current output of the AC current source. The multiple LED strings may be grouped into LED assemblies including rectifying diodes and capacitors, in some embodiments. The initial current output of the AC current source may be divided by, for example, one or more current splitting transformers in order to provide currents to each of the multiple LED assemblies. The amplitude of the currents through each LED assembly may be determined by the transformation ratio of the current splitting transformers used. In some cases, the current splitting transformers are located between the current source and the LED assemblies. If the current splitting transformers are located between the LED assemblies and the current source, the current splitting transformers further act as isolating transformers for the LED assemblies.

The lighting driver circuit may include multiple switches controlled by the MCU and connected to the LED assemblies, in some embodiments. The switches may apply or cut off current through each of the LED assemblies, and in some embodiments the switches are directly connected to the LED assemblies while in other embodiments the current splitting transformers are located between the switches and the LED assemblies. Splitting currents into individual LED assemblies in a predetermined proportion reduces the peak current during PWM control, in some embodiments. In addition to controlling the amplitude of the AC current source, the MCU may also provide multiple PWM signals to the multiple switches. The duty cycle of these PWM signals controls the switches, in such an example, thus providing independent control of the individual LED assemblies. In one embodiment, the amplitude of the AC current through each of the LED assemblies is dependent upon the value of the initial current from the current source as well as the transformation ratio of the current splitting transformers, while the timing of the switches is dependent upon the duty cycle of the PWM signals provided from the MCU.

System Architecture

FIG. 1 illustrates an example LED control circuit configured for independent control of multiple LED assemblies, in accordance with an embodiment of the present invention. In this example embodiment, the circuit may include a controller, current source, and multiple switches S1-3 corresponding to the multiple LED assemblies LED 1-3. Each LED assembly, which may include rectifier diodes and capacitors, may be implemented in numerous topologies. In this particular example, LED assemblies 1-3 are connected in series with the current source, while each of switches S1-3 may be connected to shunt the corresponding LED currents. Each of the switches may be, for example, low ON-resistance electronic AC switches. Applying pulse width modulated (PWM) control signals to the switches may provide independent control of the average current into individual LED assemblies proportional to the duty cycle of the PWM signal, in some embodiments. In one example, the controller is an MCU with multiple independent PWM outputs which control the switches S1-3 as well as the current source. One of these outputs may provide on-off control for the current source by discontinuing the AC generation during its PWM off-cycle, in some embodiments. Such dual control may provide high efficiency by eliminating loss when all switches are on. In one embodiment, an MCU dynamically chooses proper PWM duty cycle values for the switches, while also controlling the amplitude of the current provided by the current source.

Figure 2D:
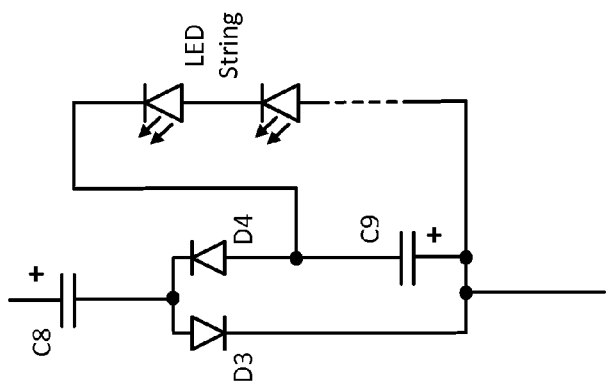
FIGS. 2a-d illustrate various LED assembly configurations, according to multiple embodiments of the present invention.
Figure 2C:
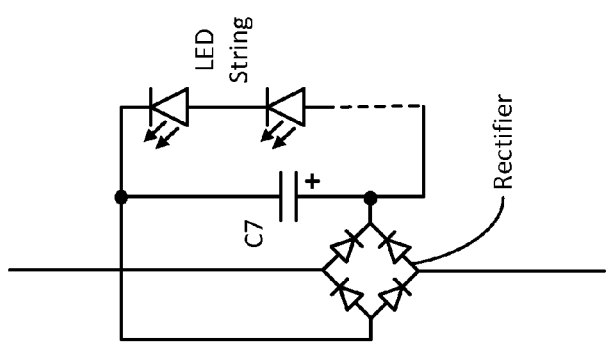
Figure 2B:
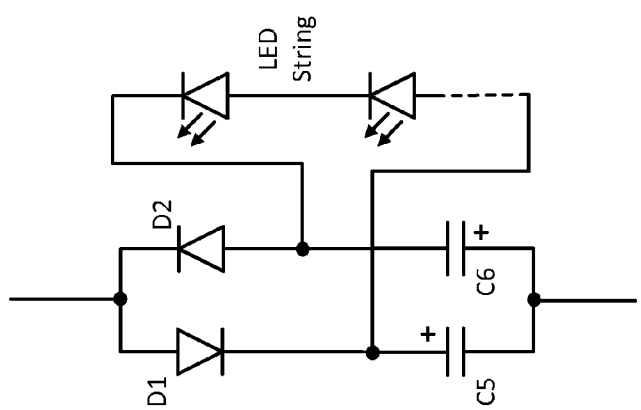
Figure 2A:
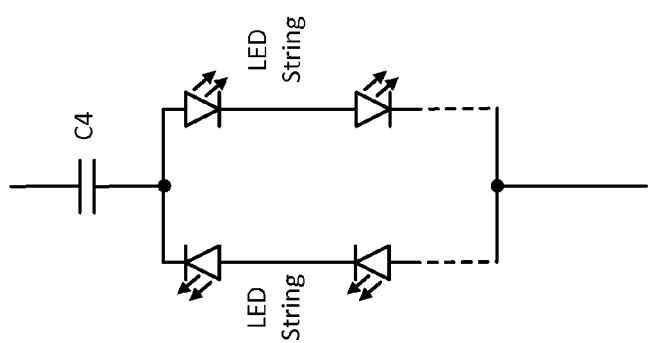

FIGS. 2a-d illustrate various LED assembly configurations, according to multiple embodiments of the present invention. The LED assemblies LED 1-3 shown in FIG. 1 may be implemented in several topologies, as discussed above. FIG. 2a shows an example anti-parallel connection of LED strings with AC current flowing through each string for half of the period, according to one embodiment of the present invention. A capacitor C4 may be included ahead of the anti-parallel LED strings, as shown in this example. Such a configuration may be a low cost but energy inefficient solution due to droop loss. The phenomenon of "droop" loss describes the reduction of LED efficiency with increased amplitude of the LED current. The efficacy of LEDs can be improved, for example, in the alternative arrangements shown in FIGS. 2b-d. In such arrangements, the capacitors C5-9 which follow the rectifier in FIG. 2c and the rectifying diodes D1-4 in FIGS. 2b and 2d may store enough energy to supply nearly DC current into the LEDs, in some embodiments, thus reducing the droop loss which emanates from the ripples at the switching frequency $f_{sw}$. In some embodiments, different topologies may be mixed within one circuit. For example, LED assembly 1 in FIG. 1 may be implemented as the LED assembly of FIG. 2b, whereas LED assemblies 2-3 may be implemented as the LED assembly of FIG. 2c.

Figure 3:
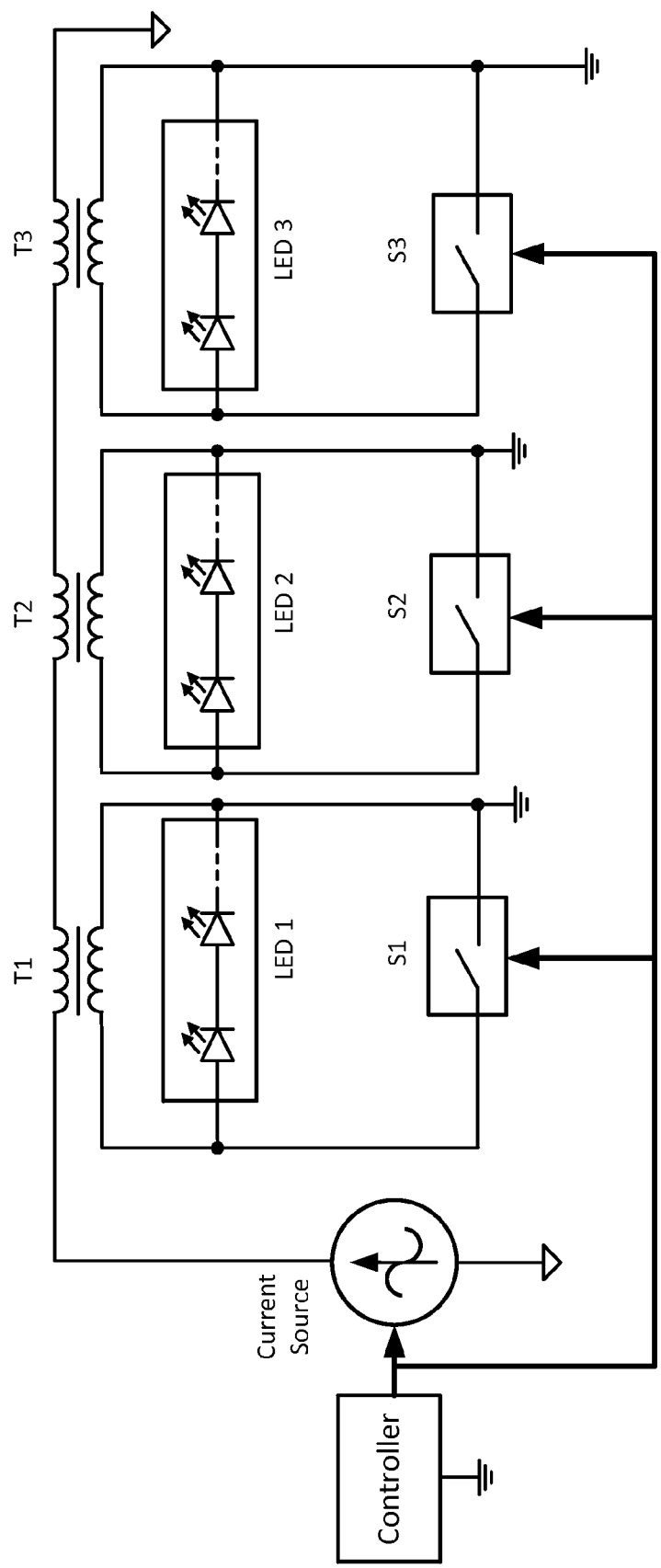
FIG. 3 illustrates an example LED control circuit configured for independent control of multiple LED assemblies, according to an embodiment of the present invention.

FIG. 3 illustrates an example LED control circuit configured for independent control of multiple LED assemblies, in accordance with an embodiment of the present invention. In this example embodiment, the circuit may include a controller, current source, and multiple switches S1-3 corresponding to the multiple LED assemblies LED 1-3. Each LED assembly, which may include rectifier diodes and capacitors, may be implemented in numerous topologies. This particular embodiment includes current transformers T1-3 with the primaries connected in series and the secondary sides of the transformers having galvanic isolation from the AC mains, which would power the current source on the primary side of the transformers. In one embodiment, the transformation coefficient of each transformer may be selected to set a desired current ratio in the strings, in some embodiments. Setting the proper current ratio may be important for ensuring minimum peak current into the LED, which reduces droop loss. One terminal of each secondary side of the transformers is connected to the common ground, which makes it possible to have switches being referenced to the common of the controller. Having PWM control signals applied to the switches to be referenced to the common ground shared by the MCU allows control of the switches without level shifting through, for example, a silicon-integrated high-side driver, gate drive transformer, or optical isolation between the controller and switches. The current source may include, for example, two stages: a first stage providing AC universal input voltage capability (e.g. 120-277V nominal input) and PFC functionality. This first stage may include a line rectifier followed by a boost converter that feeds an intermediate bus with a nominal DC voltage $V_{Bus}$ of 450V, in one particular embodiment. The second stage of the current source may include a half-bridge DC-AC converter, in some embodiments. As can be seen in this particular example, the controller is situated on the secondary side of the current source and shared the same ground as the switches S1-3, while the common on the primary side of the transformers and the current source is not connected to the secondary side and the communication of the set current from the controller to the current source may be achieved through an optocoupler.

Figure 4:
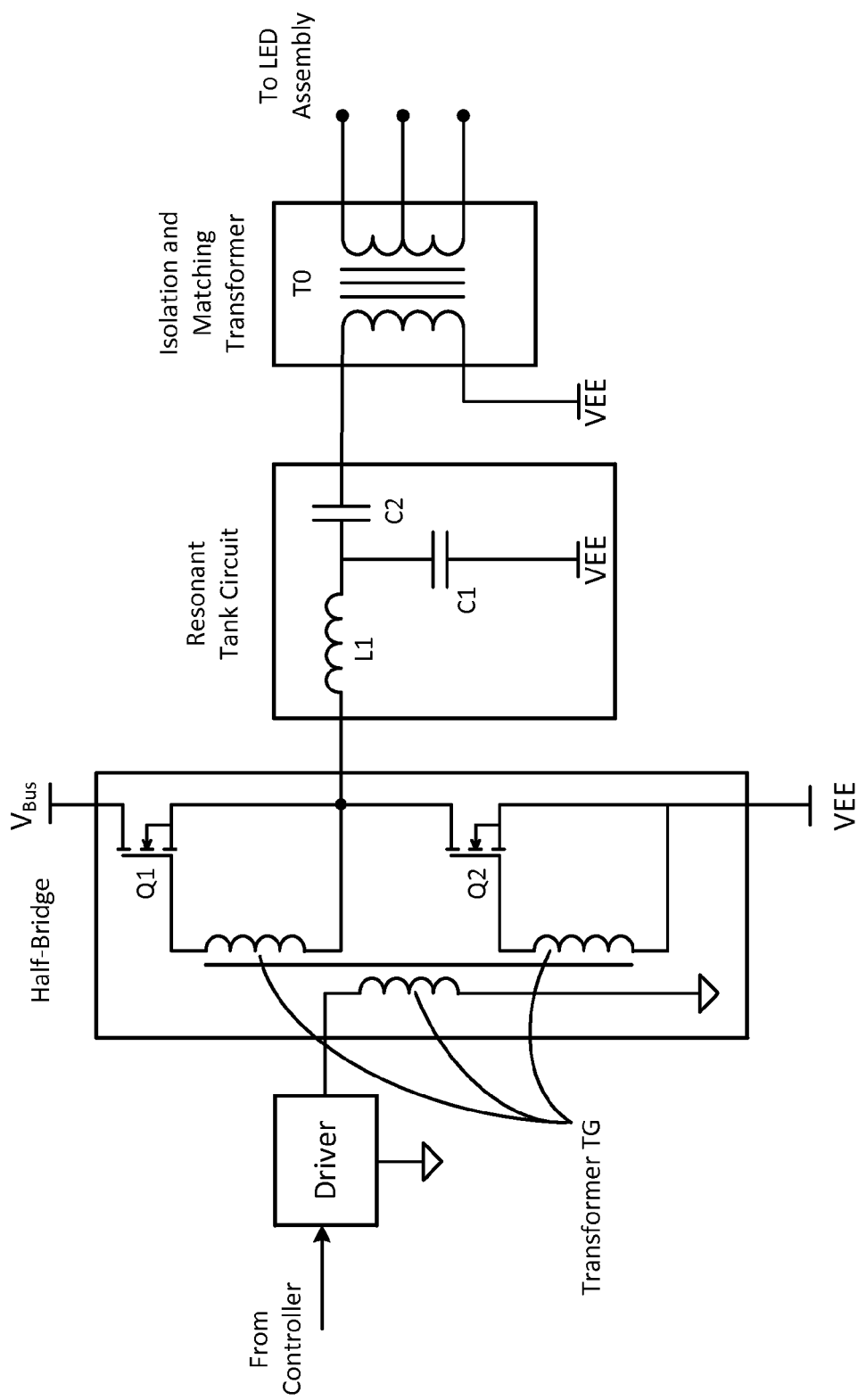
FIG. 4 shows a half-bridge DC-AC converter that may be used as the second stage of the current source of FIG. 3, according to an embodiment of the present invention.

FIG. 4 illustrates a half-bridge DC-AC converter that may be used as the second stage of the current source of FIG. 3, in accordance with one embodiment of the present invention. In this example embodiment, the DC-AC converter includes a driver, half-bridge, resonant tank circuit, and isolation and matching transformer T0. The driver circuit in this example receives a signal from the controller and is coupled to switching transistors Q1 and Q2 through a gate drive transformer TG. The half-bridge is comprised of the two switching transistors Q1 and Q2 and the gate drive transformer TG. It is supplied by the DC voltage $V_{Bus}$. In one particular example, switches Q1 and Q2 are IRF730 MOSFETs and the DC voltage $V_{Bus}$ was chosen to be 200V. The tank circuit in this example includes an inductor L1, and capacitors C1 (resonant capacitor) and C2 (DC blocking capacitor); however, other LC circuit designs may be used and will be apparent in light of this disclosure. The output of the resonant tank circuit may go to the isolating transformer that provides galvanic isolation to the LED assemblies, in some embodiments. In one particular example, the transformer has a high permeability ferrite toroid ring core, with no gap, and with each winding having 10 turns. In another embodiment, the output of capacitor C2 could be provided directly to an LED assembly assuming no galvanic isolation is required. In addition to isolating the LEDs from the mains, in some embodiments the transformer may also be used for load matching and voltage matching of unequal LED strings requiring different voltages. As mentioned above, the series resonant inverter could be self-oscillating or externally driven. For ease of description, examples are provided with externally driven series resonant inverters.

Figure 5A:
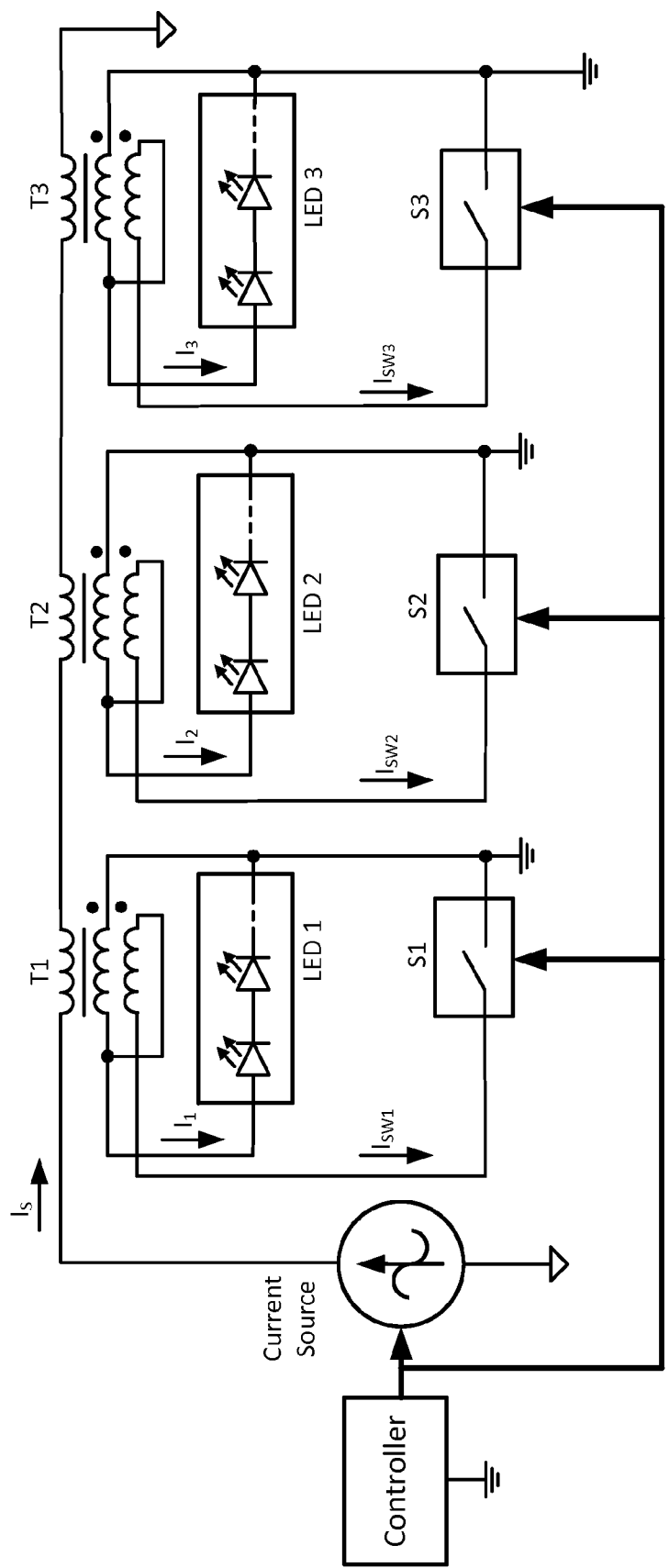
FIGS. 5a-b illustrates example LED control circuits configured for independent control of multiple LED assemblies, according to two embodiments of the present invention.

FIG. 5a illustrates an example LED control circuit configured for independent control of multiple LED assemblies, in accordance with another embodiment of the present invention. In this example embodiment, the circuit may include a controller, current source providing current $I_S$, and multiple switches S1-3 corresponding to the multiple LED assemblies LED 1-3. Whenever one of the multiple switches S1-3 is turned on the respective LED assembly will not be provided with any additional energy (this is referred to as "PWM off-cycle" from the current source, as the respective LED assembly is effectively bypassed by the respective switch. Each LED assembly, which may include rectifier diodes and capacitors, may be implemented in numerous topologies (e.g., the topologies shown in FIGS. 2a-d). This particular embodiment includes current transformers T1-3 with the primaries connected in series and the secondary sides of the transformers having galvanic isolation from the AC mains, which would power the current source on the primary side of the transformers. One terminal of each secondary side of the transformers is connected to the common ground, which makes it possible to have switches being referenced to the common of the controller. In this particular embodiment, an extra winding is included on the secondary side of the current transformers, which allows for decreasing the currents $I_{SW1}$ through $I_{SW3}$ flowing through the closed switches (compared with the current through the associated LED assembly, $I_1$-$I_3$). Decreasing the current through the switches may reduce losses and/or allow the switches to be used with a higher on-resistance, in some embodiments. Note that this approach of reducing the switch current has practical limitations. For example, as the number of turns on the extra winding is increased, the transformer coupling is reduced and the necessary switch voltage increases. This leaves room for optimizing the particular implementation for minimal cost for given performance.

Figure 5B:
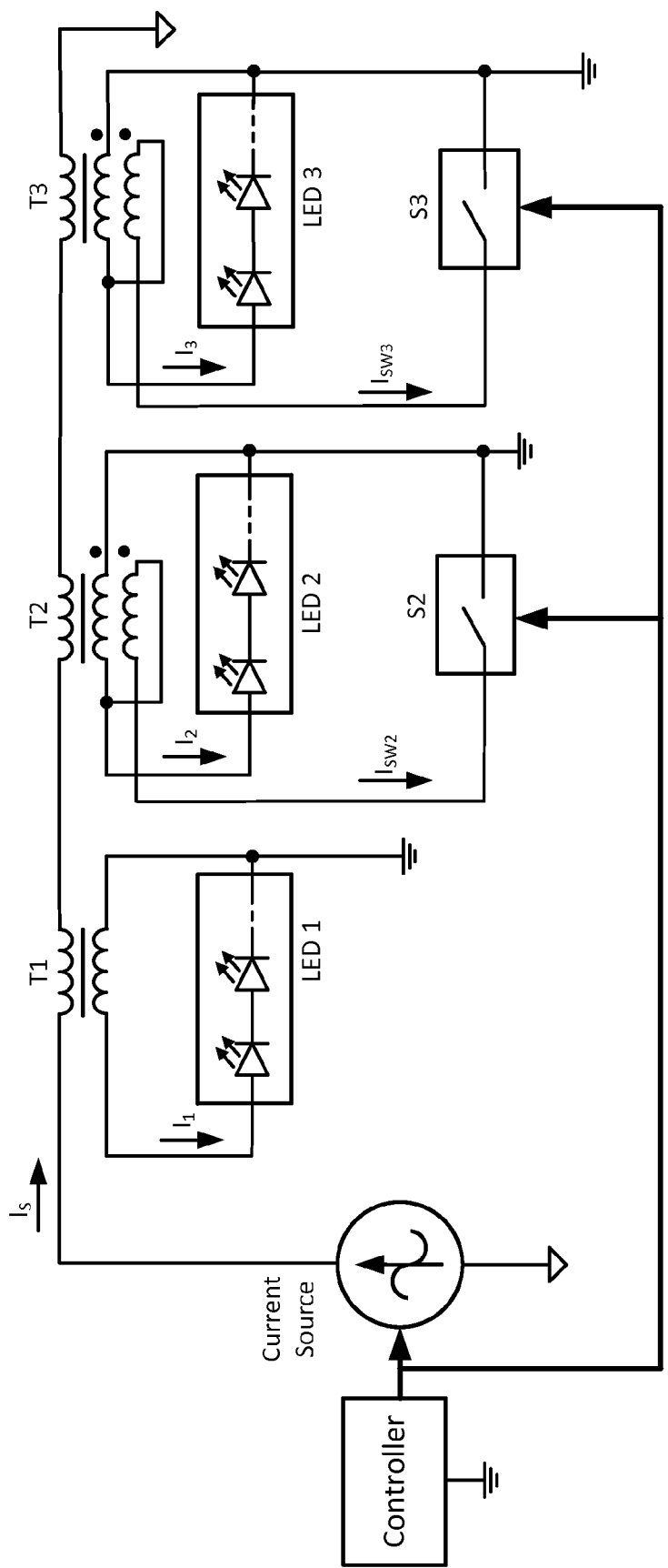

FIG. 5b illustrates an example LED control circuit configured for independent control of multiple LED assemblies, in accordance with another embodiment of the present invention. In this example embodiment, the circuit may include a controller, current source, and multiple switches S2-3 corresponding to two of the LED assemblies LED 2-3. Each LED assembly, which may include rectifier diodes and capacitors, may be implemented in numerous topologies. This particular embodiment includes current transformers T1-3 with the primaries connected in series and the secondary sides of the transformers having galvanic isolation from the AC mains, which would power the current source on the primary side of the transformers. One terminal of each secondary side of the transformers is connected to the common ground, which makes it possible to have switches being referenced to the common of the controller. In this particular embodiment, LED assembly 1 has a PWM duty cycle longer than LED 2 and LED 3 (this is referred to as LED 1 duty cycle is "leading"; the duty cycles can be varied between 0%-100%) so the control effort may be reduced by omitting switch S1 shown in FIG. 5a. In this example, an extra winding is included on the secondary side of the current transformers T2-3, which allows for decreasing the current $I_{SW}$ flowing through the closed switches S2-S3 (compared with the current through the associated LED assembly, $I_2$-$I_3$). Decreasing the current through the switches may reduce losses and/or allow the switches to be used with a higher on-resistance, in some embodiments. In this simplified scheme, control of LED 1 is achieved by controlling the current $I_S$ provided by the current source (e.g. pulse width and/or amplitude) while the other LED arrangements are controlled through their respective switches S2-3.

Figure 6A:
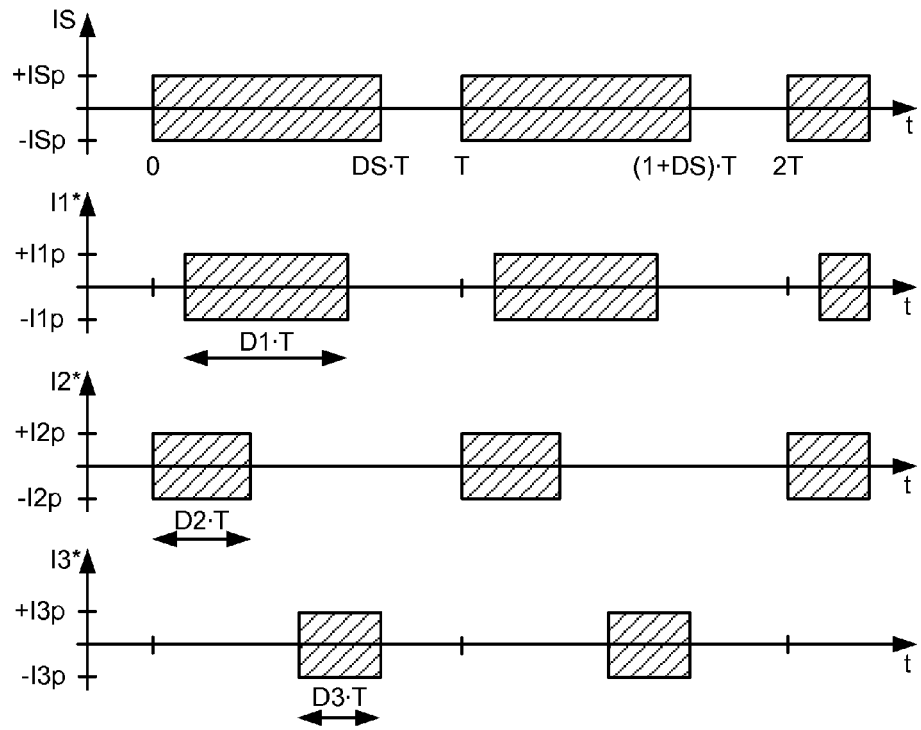
FIGS. 6a-b show example envelopes of high frequency AC currents as a function of time for the circuits in FIGS. 5a and 5b respectively, according to two embodiments of the present invention.
Figure 6B:
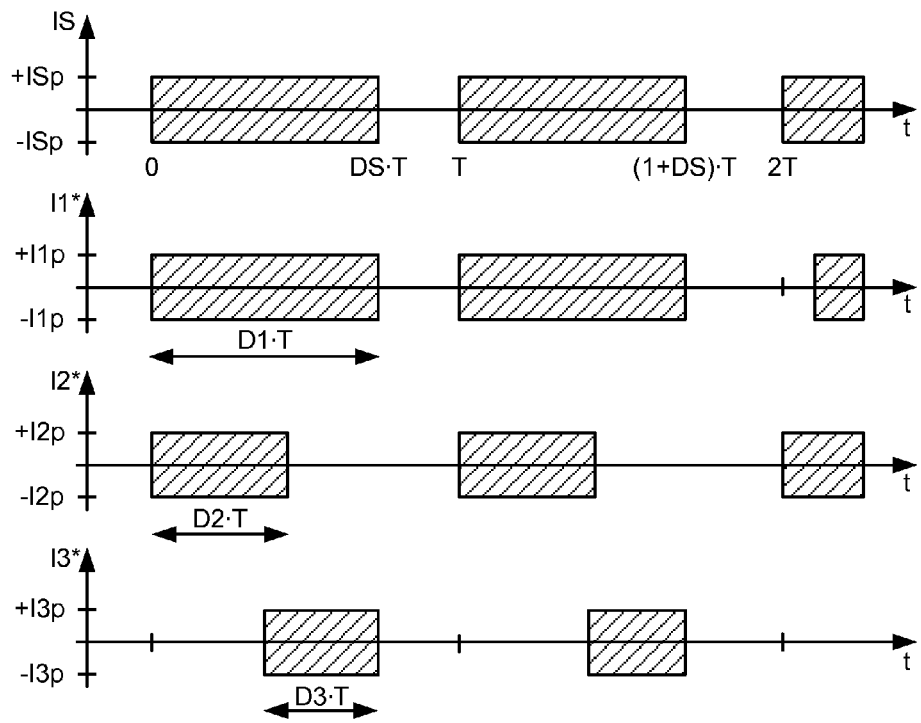

FIGS. 6a and 6b show example envelopes of high frequency AC currents as a function of time for the circuits in FIGS. 5a and 5b respectively, according to two embodiments of the present invention. Those current envelopes belong to the current $I_S$ from the current source and the currents $I_1$, $I_2$, and $I_3$ from each of the LED arrangements LED 1-3. More accurately, the figures show the envelopes of the currents $I_1^*$-$I_3^*$, which are the envelopes of the currents $I_1$-$I_3$ divided by the current transformation ratios $n_1$T1-$n_3$T3 of the respective transformers T1-T3, wherein "$n_i$" equals the current transformation ratio (approximately the turns ratio) of the respective transformer. The figures also indicate the respective time intervals of the low frequency PWM duty cycles DS, D1, D2, and D3 multiplied by the period of time T of the PWM generated by the controller. The two examples given in FIGS. 6a and 6b illustrate cases where LED 1 is the leading LED arrangement. Note that when all the currents $I_1$-$I_3$ are off ($I_1$-$I_3$ are zero or very close to zero amperes), meaning all of the PWM signals controlling the switches enabling arrangements LED 1-3 are in the off-cycle, the current source producing $I_S$ is also off. The PWM duty cycle DS in FIG. 6b equals the PWM duty cycle D1, meaning whenever the current source provides current there is also a current $I_1$ flowing, which for example would always be the case for the arrangement shown in FIG. 5b.

Figure 7:
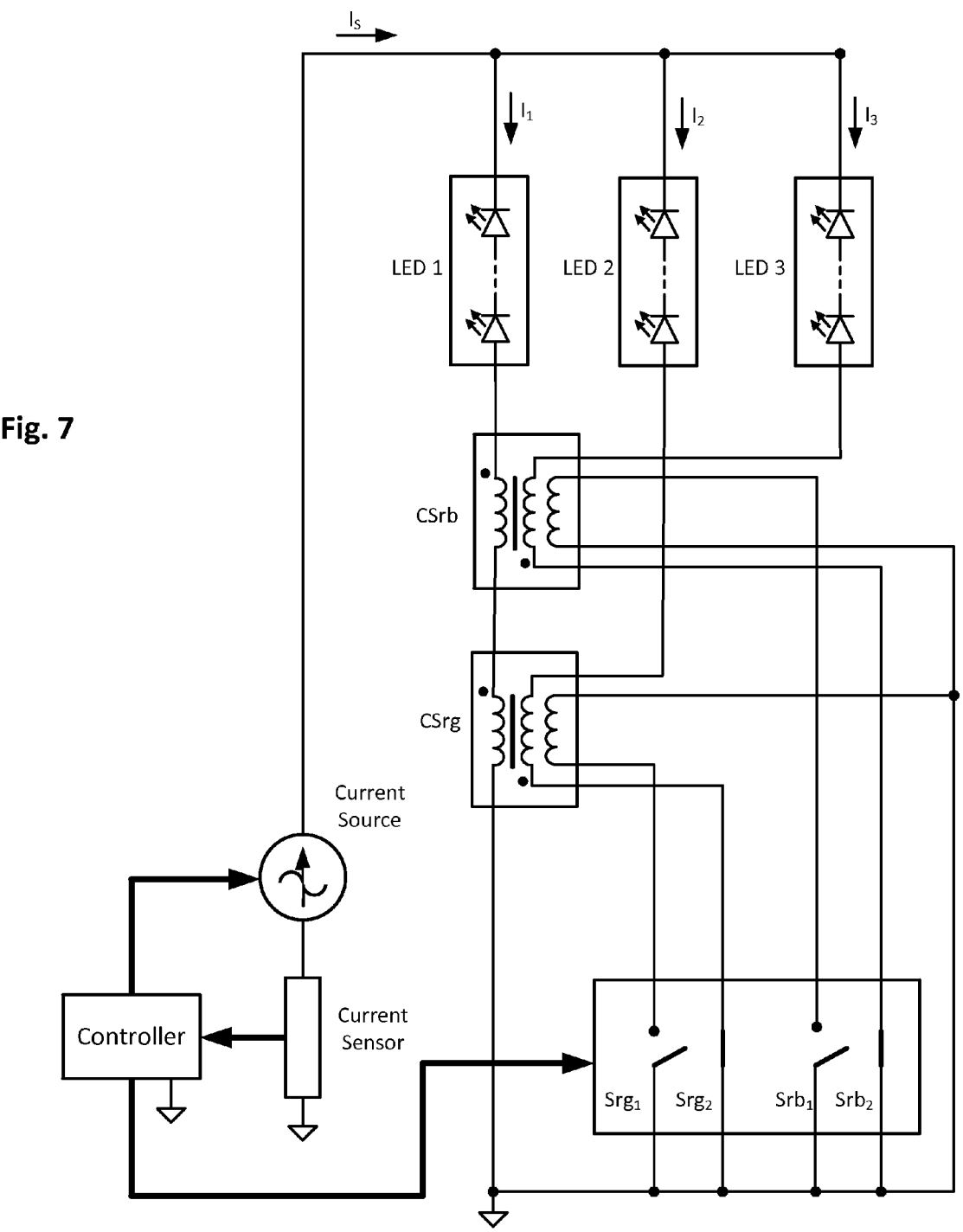
FIG. 7 illustrates an example LED control circuit configured for independent control of multiple LED assemblies, according to another embodiment of the present invention.

FIG. 7 illustrates an example LED control circuit configured for independent control of multiple LED assemblies, in accordance with another embodiment of the present invention. In this particular example, the circuit includes a controller, current source, current sensor, LED assemblies LED 1-3, transformers CSrb and CSrg, and switches $Srg_1$, $Srg_2$, $Srb_1$, and $Srb_2$. The current sensor might be implemented for example as a shunt resistor or a current transformer. Each LED assembly, which may include rectifier diodes and capacitors, may be implemented in numerous topologies. LED assembly LED 1 includes red LEDs, LED 2 includes green LEDs and LED 3 includes blue LEDs in this example embodiment, and the current splitting transformers CSrb and CSrg split the current source three ways with current $I_1$ leading. When switches $Srg_2$ and $Srb_2$ are closed and $Srg_1$ and $Srb_1$ are open, as shown in the example of FIG. 7, the output current is split between the strings in inverse proportion to the turn ratio on each current splitting transformer. Selecting the two current splitting transformers CSrb and CSrg each with a 1:1:1 transformer ratio will result in currents $I_1$=$I_2$=$I_3$. Interrupting the current $I_2$ during PWM off-cycles requires simultaneous turn off of $Srg_2$ and turn on of $Srg_1$, while similar action is required of $Srb_2$ and $Srb_1$ to control current $I_3$.

Figure 8:
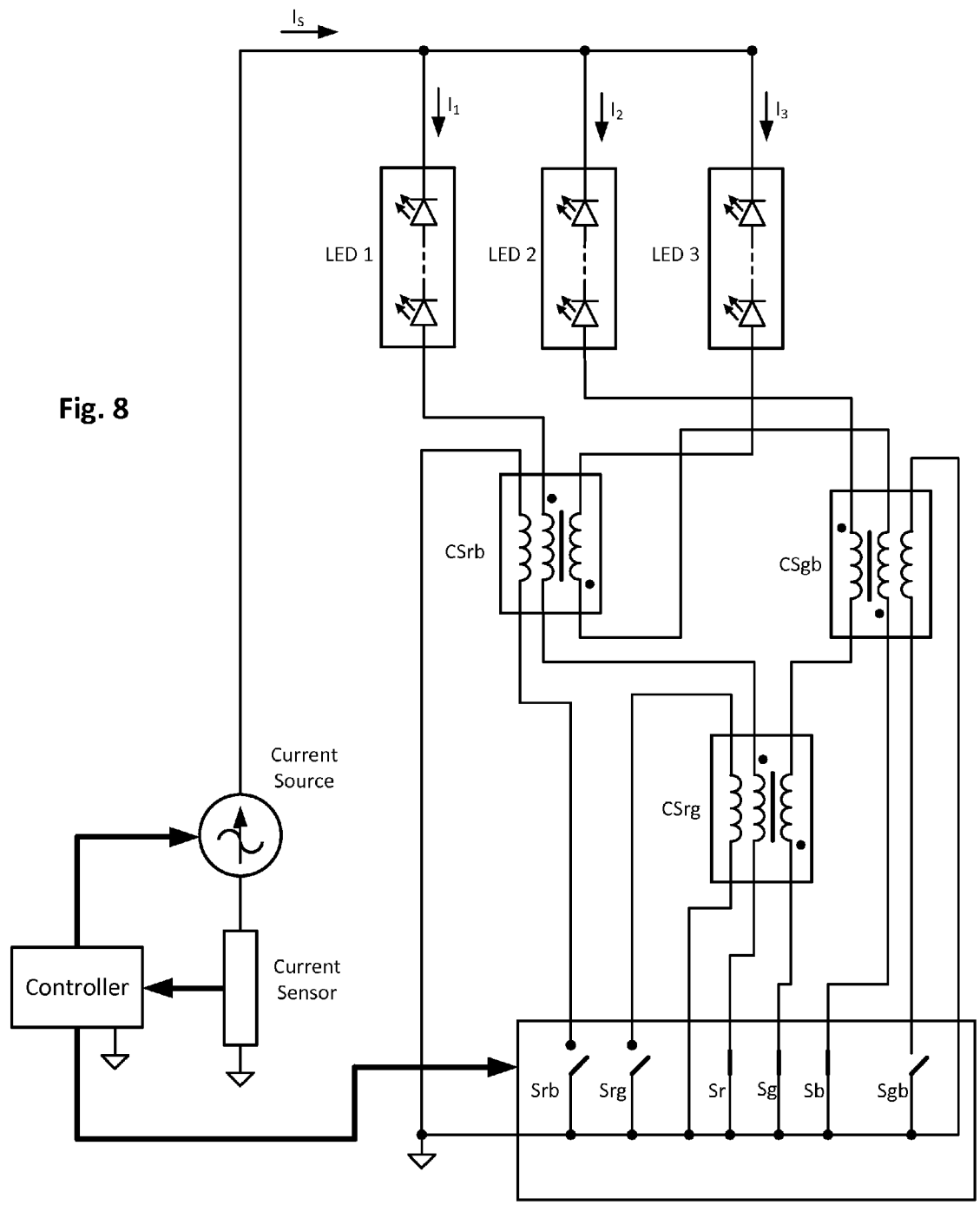
FIG. 8 illustrates an example LED control circuit configured for independent control of multiple LED assemblies, according to another embodiment of the present invention.

FIG. 8 illustrates an example LED control circuit configured for independent control of multiple LED assemblies, in accordance with another embodiment of the present invention. In this particular example, the circuit includes a controller, current source, current sensor, LED assemblies LED 1-3, transformers CSrb, CSrg, and CSgb, and switches Srb, Srg, Sr, Sg, Sb, and Sgb. Each LED assembly, which may include rectifier diodes and capacitors, may be implemented in numerous topologies. LED assembly LED 1 includes red LEDs, LED 2 includes green LEDs and LED 3 includes blue LEDs in this example embodiment, and the current splitting transformers CSrb, CSrg, and CSgb split the current source three ways. Due to smaller power requirements for the transformers in this particular embodiment compared to the embodiment in FIG. 7, the transformers are required to transfer only a small fraction of the power delivered to the string, while transformers T1-3 in FIGS. 5*a*, 5*b*, and 7 are required to transfer full string power. However, the topologies described in FIGS. 7 and 8 require additional electronic AC switches as compared to the arrangements described in FIGS. 3, 5*a*, and 5*b*. A control algorithm for the circuits described in FIGS. 7 and 8 may account for changing loads, in some embodiments. When one string is turned off, for example, the currents of the other LED strings may increase, and this should be compensated for within the MCU by adjusting the output of the current source. The output of the current source may be adjusted by adjusting the amplitude of the AC current though a change in converter operating frequency as would be the case for a resonant DC-AC converter, or the low frequency PWM duty cycle of the AC current may be adjusted, in some embodiments. A feedback signal from the current sensor could simplify controlling the current output by sending the current sensor signal to the A/D input of the MCU, in one embodiment. FIG. 8 illustrates an example arrangement allowing arbitrary control of the three LED arrangements requiring three current splitting transformers and six AC switches because the circuit design does not have a fixed leading string topology (meaning any of the three LED arrangements may have the longest PWM duty cycle as there is no restriction by the circuit design). In order to isolate the LED arrangements from the mains, an additional isolation transformer may be required, in some embodiments, between the current source and the LED assemblies.

Figure 9A:
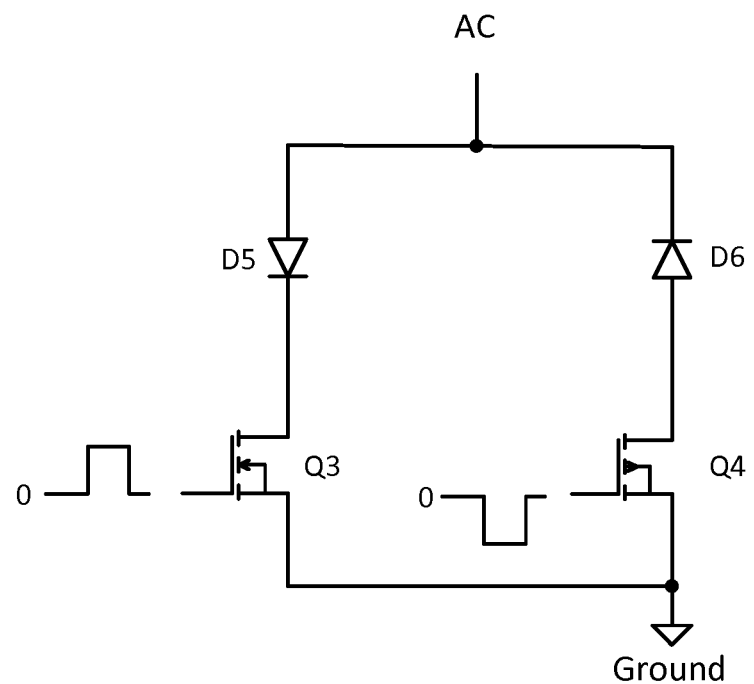
FIGS. 9a-b illustrate topologies for high frequency electronic AC switches that may be used for independent control of multiple LED assemblies, according to two embodiments of the present invention.
Figure 9B:
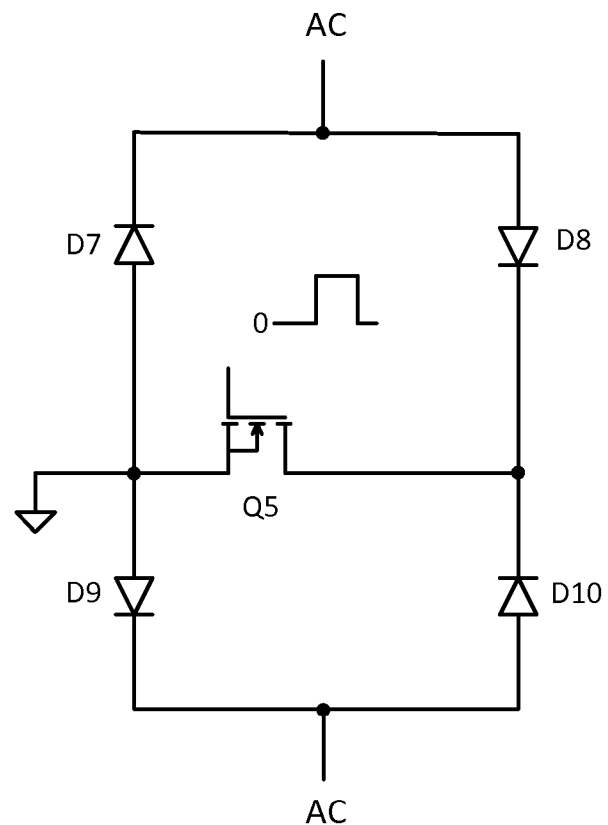

FIGS. 9*a*-*b* illustrate possible topologies for high frequency electronic AC switches that may be used for independent control of multiple LED assemblies, according to an embodiment of the present invention. Such switches may be controlled by signals referenced to the common of the MCU. The example switch shown in FIG. 9*a* includes two MOSFETs Q3 and Q4 of N- and P-type driven by ground referenced PWM pulses of opposite polarity. Diodes D5 and D6 are fast switching diodes and may prevent inverse current flow through the transistors. In another embodiment, the same topology switch may be built using N- and P-type bipolar transistors. The example switch shown in FIG. 9*a* requires two drive signals that can be either provided directly by the controller or, in case of the controller only providing one drive signal, it can be easily created from the first drive signal by an inverter circuit. The circuit shown in FIG. 9*b* includes one MOSFET or bipolar transistor Q5 and four fast switching diodes D5-10. The implementation of an AC switch according to FIG. 9*b* only requires a single drive signal, which provides greater simplicity, while on the other hand, the associated power losses of an additional diode forward voltage drop must be considered. In case of low LED string voltages, the fast switching diodes in FIGS. 9*a*-*b* may be realized by, for example, Schottky diodes rather than PiN-diodes, as Schottky diodes exhibit lower forward voltage drops and hence less associated power losses.

FIGS. 10*a*-*f* collectively illustrate an LED control circuit configured for independent control of multiple LED assemblies, in accordance with another embodiment of the present invention. In this particular example, the circuit includes a frequency generator, half-bridge, resonant tank circuit, auxiliary power supply, LED assemblies A and B, a current splitter, switches A, B, and C. In this particular example, the current splitter is a current splitting transformer that splits the current between the two LED assemblies, and LED A is the leading LED assembly. Each LED assembly, which may include rectifier diodes and capacitors, may be implemented in numerous topologies. Two strings of LEDs having 32 LEDs each were supplied with a total DC current of 400 mA from a controllable current source operating at 70 kHz including the half bridge and the resonant tank circuit, in one embodiment. The resonant tank circuit may be implemented according to the example shown in FIG. 4, however, other LC circuit designs may be used and will be apparent in light of this disclosure. Switches A and B may be constructed using MOSFETs (IRFU210 and IRF9230) following the example switch shown in FIG. 9*a*. Switches A and B are AC switches controlled by terminal C, having a fairly low impedance between terminals S and G when "on" and a fairly high impedance when "off". When switch A is off (high impedance between terminals S and G), meaning that switch C is causing switch B to be on, the total current is split in two equal parts, and if LED B were changed from 32 to 30 LEDs the current split inaccuracy would be less than 5%, in one embodiment. With switch B on and switch A off, both LED arrangements may light up with reduced but identical brightness, and the LED current in both LED strings would be identical. However, with switch A on (closed) and switch B off, LED assembly A is on and lights up to full brightness, but LED B is off. In one embodiment, by increasing the frequency of the pulse generator, the current in LED A may be set to its original value of 200 mA (before switch C was changed). The current splitter may be wound with, for example, bifilar wire on a 10×10×4 mm E-core and have inductance in each winding of about 1 mH.

Figure 10A:
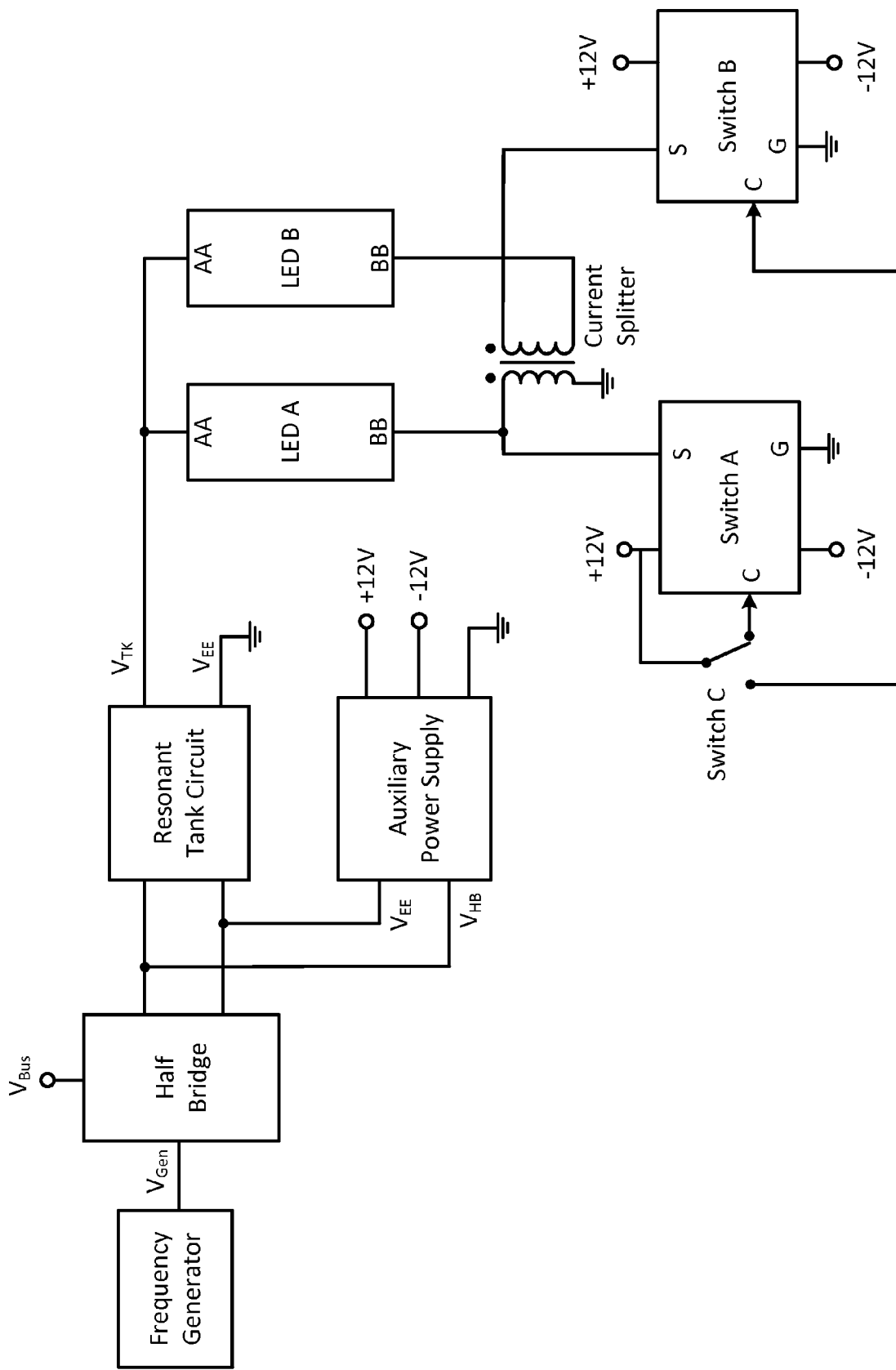
FIGS. 10a-f collectively illustrate an LED control circuit configured for independent control of multiple LED assemblies, according to another embodiment of the present invention.
Figure 10B:
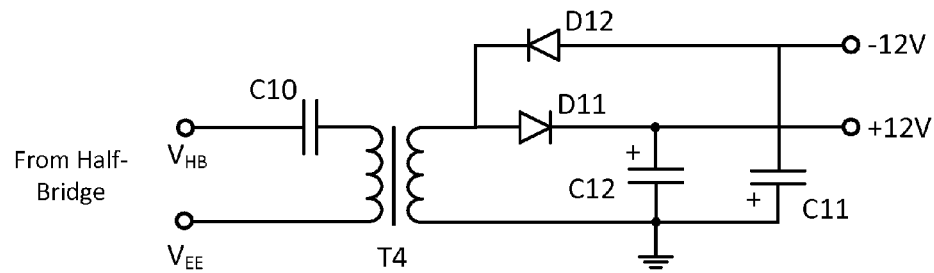
Figure 10C:
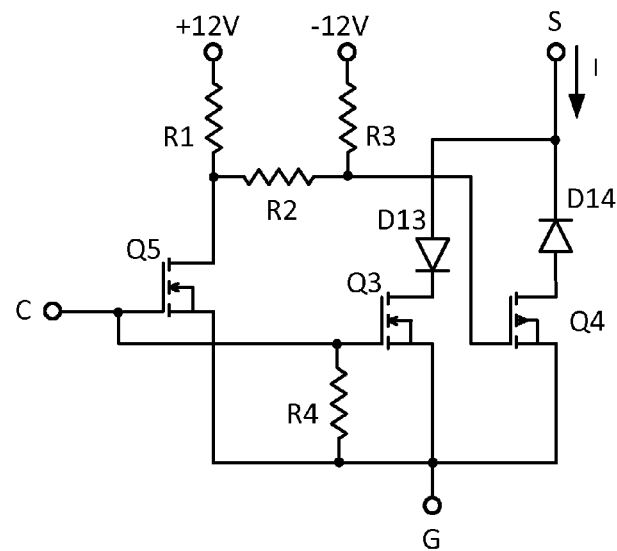
Figure 10D:
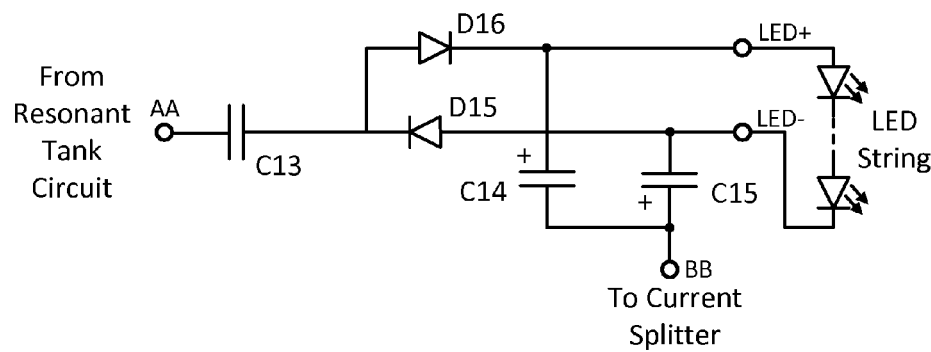
Figure 10E:
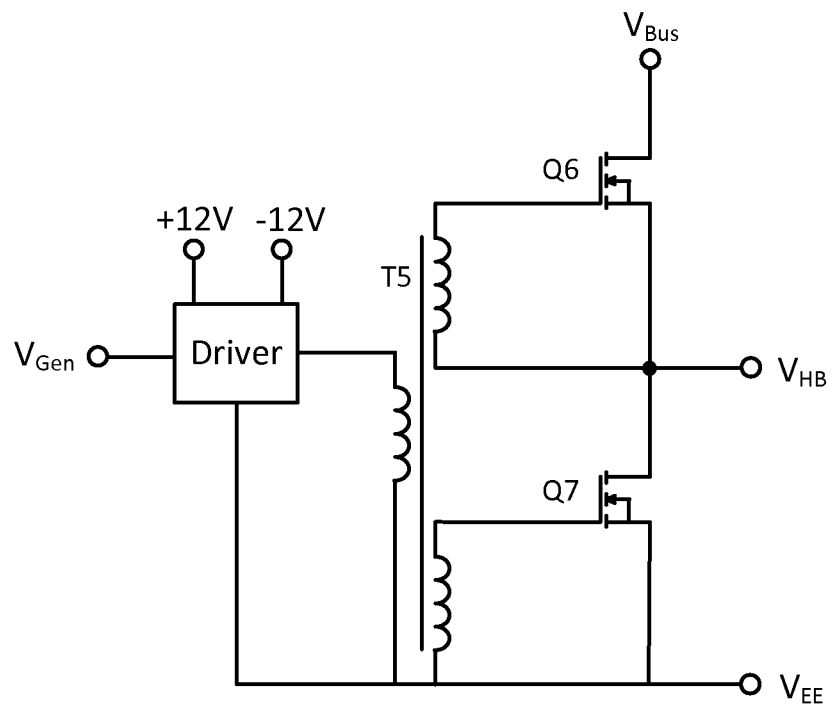
Figure 10F:
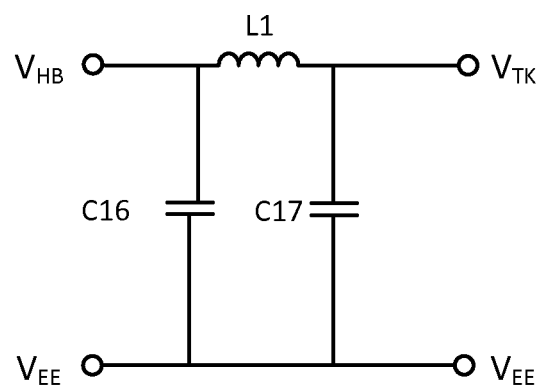

FIG. 10*b* illustrates an example circuit design for the auxiliary power supply of FIG. 10*a*. An auxiliary power supply that provides +/−12V may be assembled using a transformer, capacitors, and diodes, in one example case. In this particular example, the power supply includes a DC blocking capacitor C10 that couples the AC input from the half-bridge to a voltage-matching transformer T4, which feeds a voltage doubler including diodes D11-12 and capacitors C11-12. In one particular example, diodes D11 and D12 are MUR105 diodes. FIG. 10*c* illustrates an example circuit design for the switches A and B of FIG. 10*a*. As can be seen, in this embodiment the switch includes resistors R1-4, switches Q3-5, and diodes D13 and D14. In this particular example, diodes D13 and D14 are MUR105 diodes, and the switch connections S, C, and G correspond to the connections shown in FIG. 10*a*. In this particular example, the switch is a bi-directional switch that allows current I to flow in both directions when turned on, which is when positive voltage between C and G is present. FIG. 10*d* illustrates an example of LED arrangement circuitry for the LED assemblies LED A and LED B in FIG. 10*a*. As can be seen, in this embodiment the circuitry includes a DC blocking capacitor C13 and a voltage doubler including diodes D15-16 and capacitors C14-15 that feeds to an LED string. In one particular embodiment, diodes D15 and D16 are MUR160 diodes and capacitors C14 and C15 are 220 μF capacitors. FIG. 10*e* illustrates an example of a half-bridge circuitry of FIG. 10*a*. As can be seen, in this embodiment the circuitry includes a gate Driver which gets driven by the Frequency Generator and supplied with positive and negative voltage from the auxiliary power supply. The gate Driver output drives the gates of the two MOSFETs Q6 and Q7 through the gate drive transformer T5. FIG. 10*f* illustrates an example of a resonant tank circuit of FIG. 10*a*. As can be seen, in this embodiment the circuitry includes an inductor L1 and two capacitors C16 and C17 arranged in a Pi configuration.

Figure 11:
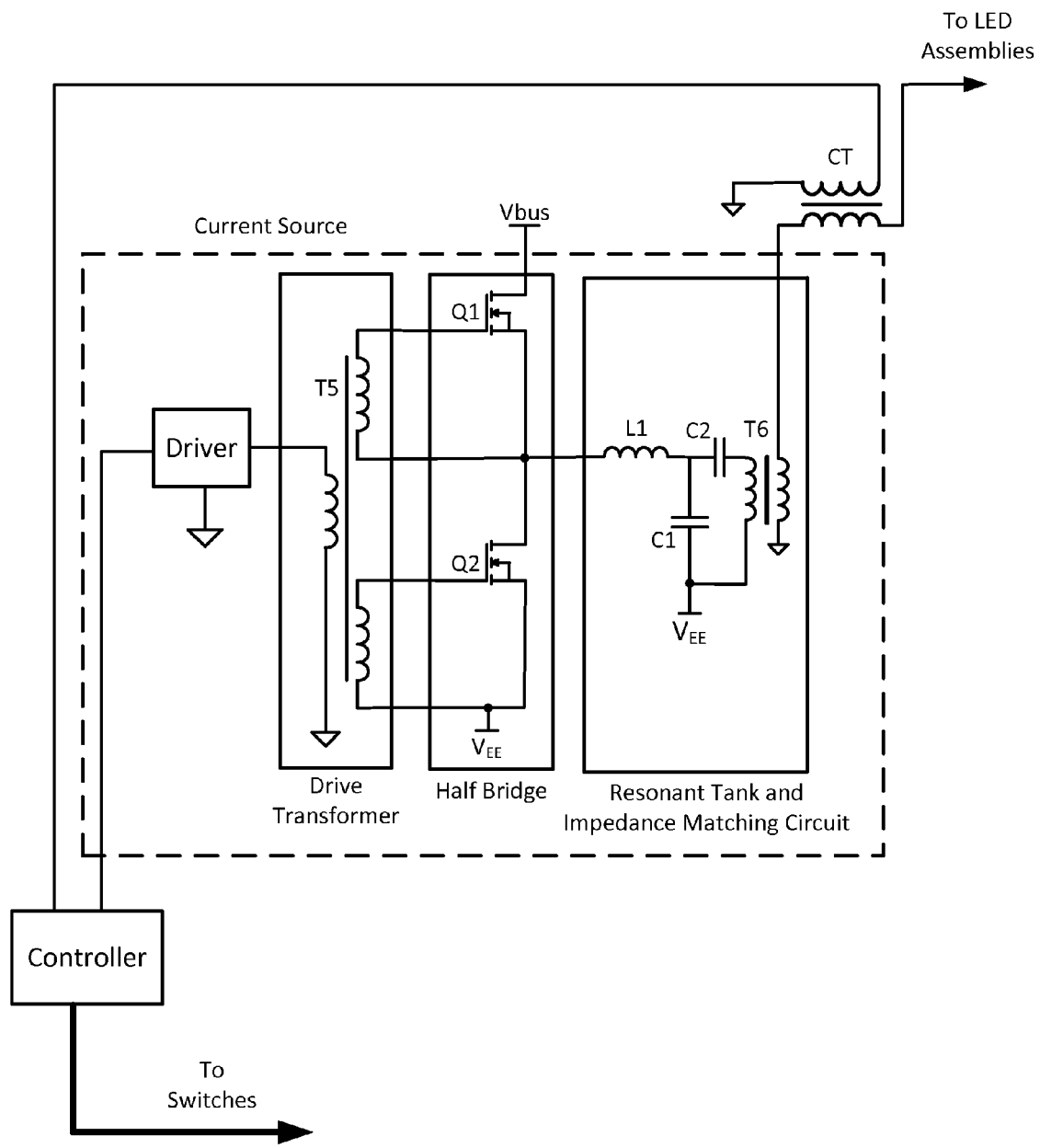
FIG. 11 illustrates an example current source and current sensing transformer CT that may be used in the circuits of FIGS. 7 and 8, according to an embodiment of the present invention.

FIG. 11 illustrates an example current source and current sensor transformer CT that may be used in the circuits of FIGS. 7 and 8 as current sensors, according to an embodiment of the present invention. As can be seen in this example, the current source includes a drive transformer T5, half-bridge, and a resonant tank and impedance matching circuit. In this embodiment, the drive transformer includes a driver and transformer T5 and functions to drive the half-bridge which includes switches Q1 and Q2, which in turn drives the resonant tank circuit. In one particular example, the switches Q1 and Q2 are IRF730 MOSFETs and the transformer T5 has a high permeability ferrite toroid ring core, with no gap, and with each winding having 10 turns. In this embodiment, the resonant tank circuit includes inductor L1, and capacitor C1, as well as the DC blocking capacitor C2 and transformer T6. In this circuit design, the voltage across capacitor C1 is the voltage on the primary side of transformer T6. Transformer CT functions as the current sensor, in this particular embodiment, and provides a low loss current sensor as compared to a resistor/load current sensor. The current source may be connected to the LED assemblies through the current sensor and the controller may be connected to the switches that control the current splitters, as described in the example embodiments of FIGS. 7 and 8.

Methodology

Figure 12:
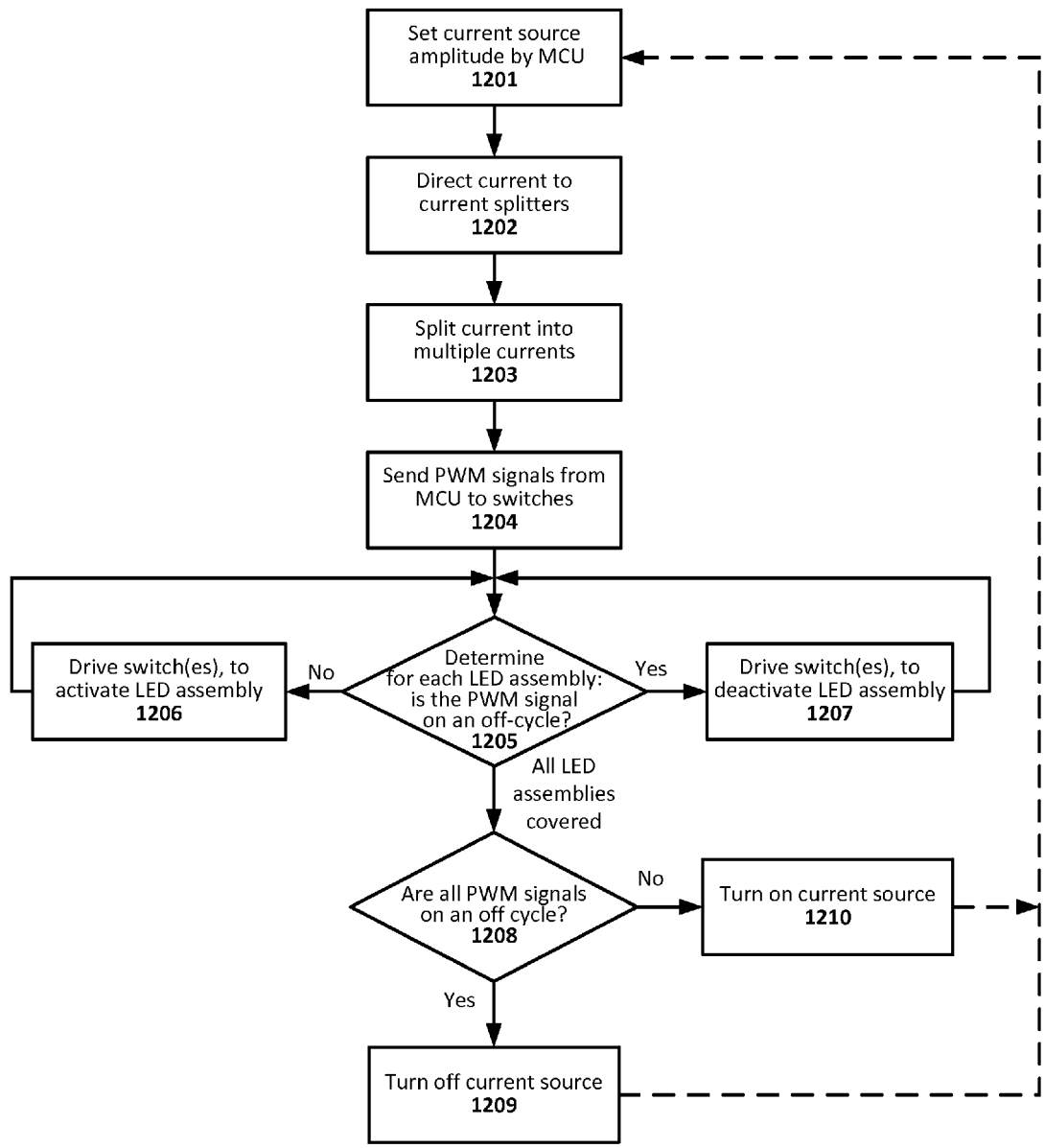
FIG. 12 illustrates a method for independently controlling individual LED strings driven from a single AC current source, according to an embodiment of the present invention.

FIG. 12 illustrates a method for independently controlling individual LED strings driven from a single AC current source, according to an embodiment of the present invention. The method may begin with setting 1201 a current source amplitude using a MCU. The current source may be, for example, a DC-AC inverter with series resonance. The method may continue with directing 1202 the current from the AC current source into current splitters. In some embodiments, the current splitters may be current splitting transformers. The method may continue with splitting 1203 the current into multiple currents, one for each LED assembly. As discussed above, each LED assembly may include rectifying diodes and capacitors and may be implemented in numerous topologies. In some cases, the current splitting transformers are located between the current source and the LED assemblies, while in other embodiments the current splitting transformers are located between the LED assemblies and a plurality of switches. If the current splitting transformers are located between the LED assemblies and the current source, they further act as isolating transformers for the LED assemblies, in some embodiments. The value of the currents going to the LED assemblies may be dependent upon the transformation ratio of the current splitting transformers. The method may continue with sending 1204 multiple PWM signals from the MCU to each of the switches. These PWM signals control the switches which activate the LED assemblies. The method may continue with determining 1205 for each LED assembly whether the PWM signal is on an off-cycle. If the PWM signal is not in an off-cycle, the method may continue with driving 1206 the corresponding switch(es) in such a way that the LED assembly associated with those switch(es) are activated. If the PWM signal is in an off-cycle, the method may continue with driving 1207 the corresponding switch(es) in such a way that the LED assembly associated with those switches are deactivated. As discussed earlier for the circuits shown FIGS. 7 and 8 more than one switch might correspond to an LED arrangement and some switches might need to be turned on whereas others need to be turned off to achieve the PWM on- or off-cycle. The method may then continue with determining 1208 whether all the PWM signals are on an off-cycle. If all the PWM signals from the MCU are in an off-cycle, the method may continue with turning off 1209 the current source. If the PWM signals are not all on an off-cycle, the method may continue with turning on 1210 the current source. The method may then start from the beginning (dashed lines) so the PWM signals are continuously monitored and updated as needed.

Numerous variations and embodiments will be apparent in light of this disclosure. One example embodiment provides a lighting driver circuit. The circuit includes an AC current source configured to provide a first current, and at least one current splitting transformer configured to split the first current and provide a current to each of a plurality of LED assemblies, wherein the current to each of the plurality of LED assemblies is dependent upon a transformation ratio of the at least one current splitting transformer. The circuit further includes a plurality of switches configured to control the current through each of the plurality of LED assemblies, and a controller operatively coupled to the plurality of switches. The controller is configured to provide a PWM signal to each of the plurality of switches, wherein the duty cycle of each PWM signal independently controls each of the plurality of switches. In some cases, the wherein the current source comprises a half-bridge and a resonant tank circuit. In some cases, the circuit includes a current sensing transformer or shunt resistor operatively coupled to the current source and configured to communicate the value of the first current to the controller. In some cases, the controller is operatively coupled to the current source, wherein the controller is configured to control the amplitude of the current source. In one such case, the controller is further configured to turn off the current source when all of the PWM signals are in the off-cycle. In some cases, the at least one current splitting transformer includes an extra winding connected to at least one of the plurality of switches. In some cases, the at least one current splitting transformer is configured to change current through at least one of the plurality of LED assemblies. In some cases, note that the current source may be configured to directly feed an LED assembly.

Another example embodiment provides a method of controlling a plurality of LED assemblies. The method includes determining, by a controller operatively coupled to an AC current source, an amplitude of a first current, outputting the first current to at least one current splitting transformer, splitting the first current into a plurality of currents using the at least one current splitting transformer, and feeding each of the plurality of currents to one of the plurality of LED assemblies, wherein the amplitude of the current to each of the plurality of LED assemblies is dependent on a transformation ratio of the at least one current splitting transformer. The method further includes providing, by the controller, a PWM signal to each of a plurality of switches, each switch operatively coupled to at least one of the plurality of LED assemblies, wherein the duty cycle of each PWM signal independently controls each of the plurality of switches. In some cases, the method includes controlling the current through each of the plurality of LED assemblies using the plurality of switches. In some cases, the method includes turning off the current source when all of the PWM signals are in the off-cycle. In some cases, the at least one current splitting transformer includes an extra winding configured to change current through at least one of the plurality of switches. In some cases, the method includes communicating the amplitude of the first current to the controller using a current sensing transformer or shunt resistor. In some cases, the method includes directly feeding an LED assembly with the current source.

Another example embodiment includes a lighting system. The system includes an AC current source configured to provide a first current, a plurality of LED assemblies, and at least one current splitting transformer configured to split the first current and provide a current to each of the plurality of LED assemblies, wherein the current to each of the plurality of LED assemblies is dependent upon a transformation ratio of the at least one current splitting transformer. The system further includes a plurality of switches configured to control the current through each of the plurality of LED assemblies, and a controller operatively coupled to the current source and the plurality of switches. The controller is configured to provide a PWM signal to each of the plurality of switches, wherein the duty cycle of each PWM signal independently controls each of the plurality of switches. The controller is further configured to turn off the current source when all of the PWM signals are in the off-cycle. In some cases, the current source comprises a half-bridge and a resonant tank circuit. In some cases, the lighting system includes a current sensing transformer or shunt resistor configured to communicate the value of the first current to the controller. In some cases, the plurality of LED assemblies includes different colored LED assemblies. In some cases, the system includes an extra winding on the at least one current splitting transformer, the extra winding configured to change current through at least one of the plurality of switches. In some cases, one of the plurality of LED assemblies is fed directly by the first current source.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A lighting driver circuit comprising:
    an AC current source configured to provide a first current;
    at least one current splitting transformer configured to split the first current and provide a current to each of a plurality of LED assemblies, wherein the current to each of the plurality of LED assemblies is dependent upon a transformation ratio of the at least one current splitting transformer and the current source is configured to directly feed an LED assembly;
    a plurality of switches configured to control the current through each of the plurality of LED assemblies; and
    a controller operatively coupled to the plurality of switches, wherein the controller is configured to provide a PWM signal to each of the plurality of switches, wherein the duty cycle of each PWM signal independently controls each of the plurality of switches.

2. The circuit of claim 1 wherein the current source comprises a half-bridge and a resonant tank circuit.

3. The circuit of claim 1 further comprising a current sensing transformer or shunt resistor operatively coupled to the current source and configured to communicate the value of the first current to the controller.

4. The circuit of claim 1 wherein the controller is operatively coupled to the current source, wherein the controller is configured to control the amplitude of the current source.

5. The circuit of claim 4 wherein the controller is further configured to turn off the current source when all of the PWM signals are in the off-cycle.

6. The circuit of claim 1 wherein the at least one current splitting transformer includes an extra winding connected to at least one of the plurality of switches.

7. The circuit of claim 1 wherein the at least one current splitting transformer is configured to change current through at least one of the plurality of LED assemblies.

8. A method of controlling a plurality of LED assemblies comprising:
    determining, by a controller operatively coupled to an AC current source, an amplitude of a first current;
    outputting the first current to at least one current splitting transformer;
    splitting the first current into a plurality of currents using the at least one current splitting transformer;
    feeding each of the plurality of currents to one of the plurality of LED assemblies, wherein the amplitude of the current to each of the plurality of LED assemblies is dependent on a transformation ratio of the at least one current splitting transformer;
    providing, by the controller, a PWM signal to each of a plurality of switches, each switch operatively coupled to at least one of the plurality of LED assemblies, wherein the duty cycle of each PWM signal independently controls each of the plurality of switches; and
    directly feeding an LED assembly with the current source.

9. The method of claim 8 further comprising controlling the current through each of the plurality of LED assemblies using the plurality of switches.

10. The method of claim 8 further comprising turning off the current source when all of the PWM signals are in the off-cycle.

11. The method of claim 8 wherein the at least one current splitting transformer includes an extra winding configured to change current through at least one of the plurality of switches.

12. The method of claim 8 further comprising communicating the amplitude of the first current to the controller using a current sensing transformer or shunt resistor.

13. A lighting system comprising:
    an AC current source configured to provide a first current;
    a plurality of LED assemblies;
    at least one current splitting transformer configured to split the first current and provide a current to each of the plurality of LED assemblies, wherein the current to each of the plurality of LED assemblies is dependent upon a transformation ratio of the at least one current splitting transformer;
    a plurality of switches configured to control the current through each of the plurality of LED assemblies;
    a controller operatively coupled to the plurality of switches, wherein the controller is configured to provide a PWM signal to each of the plurality of switches, wherein the duty cycle of each PWM signal independently controls each of the plurality of switches, wherein the controller is further configured to turn off the current source when all of the PWM signals are in the off-cycle; and
    an extra winding on the at least one current splitting transformer, the extra winding configured to change current through at least one of the plurality of switches.

14. The system of claim 13 wherein the current source comprises a half-bridge and a resonant tank circuit.

15. The system of claim 13 further comprising a current sensing transformer or shunt resistor configured to communicate the value of the first current to the controller.

16. The system of claim 13 wherein the plurality of LED assemblies includes different colored LED assemblies.

17. The system of claim 13 wherein one of the plurality of LED assemblies is fed directly by the first current source.

* * * * *